(12) United States Patent
Törngren et al.

(10) Patent No.: US 6,884,979 B1
(45) Date of Patent: Apr. 26, 2005

(54) METHOD AND APPARATUS FOR UNIFORM HEATING IN A MICROWAVE OVEN

(75) Inventors: Per Törngren, Norrköping (SE); Ulf Nordh, Norrköping (SE); Håkan Carlsson, Norrköping (SE); Roland Ekinge, Norrköping (SE)

(73) Assignee: Whirlpool Corporation, Benton Harbor, MI (US)

( * ) Notice: Subject to any disclaimer, the term of this patent is extended or adjusted under 35 U.S.C. 154(b) by 13 days.

(21) Appl. No.: 10/380,730

(22) PCT Filed: Sep. 13, 2001

(86) PCT No.: PCT/EP01/10610

§ 371 (c)(1),
(2), (4) Date: Jul. 7, 2003

(87) PCT Pub. No.: WO02/23953

PCT Pub. Date: Mar. 21, 2002

(30) Foreign Application Priority Data

Mar. 21, 2002 (SE) .............................................. 0003290

(51) Int. Cl.⁷ .............................. H05B 6/68; H05B 6/70
(52) U.S. Cl. ...................... 219/746; 219/697; 219/709; 219/710; 219/748; 219/750

(58) Field of Search ................................. 219/695–697, 219/709–712, 705, 702, 746–750

(56) References Cited

U.S. PATENT DOCUMENTS

| | | | | |
|---|---|---|---|---|
| 3,764,770 A | * | 10/1973 | Saad et al. ................... | 219/750 |
| 4,323,745 A | * | 4/1982 | Berggren ..................... | 219/697 |
| 4,476,363 A | * | 10/1984 | Berggren et al. ........... | 219/693 |
| 5,008,506 A | * | 4/1991 | Asmussen et al. .......... | 219/696 |
| 5,632,921 A | * | 5/1997 | Risman et al. .............. | 219/750 |
| 6,104,018 A | * | 8/2000 | Varma et al. ................ | 219/746 |

FOREIGN PATENT DOCUMENTS

WO    WO 99 48336 A  *  9/1999

* cited by examiner

*Primary Examiner*—Philip H. Leung
(74) *Attorney, Agent, or Firm*—Stephen Krefman; Robert O. Rice; John F. Colligan

(57) ABSTRACT

A microwave oven and a method for heating a load which is placed therein. According to the invention a predetermined mode in the cavity of a microwave oven is fed by means of an associated feeding port which is arranged to feed essentially the intended mode only, the feeding of a mode other than the intended, predetermined mode being essentially prevented.

20 Claims, 16 Drawing Sheets

METHOD AND APPARATUS FOR UNIFORM HEATING IN A MICROWAVE OVEN

TECHNICAL FIELD

The present invention generally relates to the field of microwave ovens and, more particularly, to the feeding of microwaves to a cavity in a microwave oven for heating food which is placed in said cavity.

TECHNICAL BACKGROUND

When heating a load in the form of food by means of a microwave oven, there are a number of aspects which have to be considered. Most of these aspects are well-known to those skilled in the art and include, for instance, the desire to obtain uniform heating of the food at the same time as a maximum amount of available microwave power is absorbed in the food with a view to achieving a satisfactory degree of efficiency.

In order to achieve uniform heating of the load, microwave stirrers and/or a rotating plate; on which the load is to be placed, have earlier been used.

In order to provide efficient coupling of microwaves to the cavity in a microwave oven, it has previously been suggested that a microwave source having a controllable frequency might be used. U.S. patent specification U.S. Pat. No. 4,196,332, for example, discloses such a microwave oven that works according to a predetermined pattern. First a frequency scan within a predetermined range is carried out, during which reflections from the cavity are detected, and the frequencies which give the lowest reflection are stored in a memory. Then the cavity of the microwave oven is fed with microwaves of a predetermined frequency which gives a low degree of reflection. The same specification also suggests jumping between a plurality of more or less optimal frequencies.

SUMMARY OF THE INVENTION

A general object of the present invention is to provide a microwave oven in which, on the one hand, the heating of a load in the oven is more homogeneous, and, on the other hand, the heating of the load in relation to available microwave power is greater than that allowed by prior-art microwave ovens.

This object is achieved by means of a microwave oven and methods in connection with the same of the type stated in the appended claims.

Microwave ovens according to prior-art technique use relatively broadband microwave sources which are adapted to feed energy to a maximum part of the cavity of the microwave oven and excite a large number of modes and, thus, provide heating of a load that is placed in the cavity. However, interference between the modes in the cavity results in places with undesirably-low energy density and places with undesirably high energy density. Such places ate sometimes called "cold spots" and "hot spots", respectively, since the heating of the load in these places becomes too low and too high, respectively. To a certain extent, the present invention is based on an understanding of how narrow-band microwave sources operate in a microwave oven. In fact, it is possible to excite, by means of a narrow-band microwave source, one and only one mode in the cavity and, thus, obtain excellent control of the energy distribution in the cavity on condition that the microwaves are fed to the cavity by means of carefully positioned feeding ports. Further mode selectivity in connection with feeding is obtained by the emission frequency of the microwave source being selected so that it suits the intended mode in the cavity. In this connection, a microwave source is thus considered to be of a narrow-band type if it emits microwaves within a frequency range which is so small that excitation of essentially one predetermined mode in the cavity is allowed. The location of feeding ports in accordance with the present invention will be discussed at length in the following detailed description of a number of preferred embodiments of the invention.

The following description of the invention relates to, above all, a microwave oven which operates with microwaves in the frequency range 2.4–2.5 GHz, which is a common frequency range as regards microwave ovens for household use. Also other frequencies can be used for microwave heating (e.g. frequencies around 915 MHz) and the present invention is, of course, also applicable within these other frequency ranges.

Preferably, the narrow-band microwave generator used in the present invention is a solid-state based microwave generator that comprises, for example, silicon carbide components (SiC). The advantages of a solid-state based microwave generator comprise the possibility of controlling the frequency of the generated microwaves, controlling the output power from the generator and an inherent narrow-band feature. The frequencies of the microwaves that are emitted from a solid-state based generator usually constitute only a very narrow range of the above-mentioned available range of 2.4 to 2.5 GHz.

The invention is thus based on the understanding of how the modes allowed by the cavity of a microwave oven can be used in order to achieve efficient and uniform heating of a load in the cavity.

In line with the fundamental inventive concept, there is also the understanding of the advantages of feeding microwaves to the cavity by means of one or more feeding ports in the enclosing surface of the cavity, where each feeding port is arranged to feed energy to essentially one predetermined mode in the cavity. In some cases, a feeding port that is not used at the moment is preferably short-circuited, thus preventing the microwave energy from being let out of the cavity via said feeding port.

Moreover, the invention is based on deeper understanding of how a mode in the cavity of the microwave oven is changed or becomes distorted when a load is placed in the cavity.

The mode pattern in the cavity of a microwave oven does not look the same when the cavity is empty as in the case where it contains a load. When a load is placed in the cavity, the mode pattern will, however, change in a way that in some sense is predictable. Usually, the mode pattern, although a load is placed in the cavity, is essentially unchanged in at least one dimension (height, width or depth).

It should be noted that when the expression "mode" is used in the following, it is related to the field pattern in the cavity as it appears when the cavity is empty, that is in a cavity without a load. In the light of these facts, it is easy to understand what is meant by, for instance, the terms "distorted", or "altered", mode.

According to one aspect of the invention, a microwave oven is provided, which comprises a cavity that is fitted with at least one feeding port, through which microwaves are to be fed, the feeding port being arranged to feed energy to one single predetermined mode in the cavity. In other words, feeding of energy through said port to a mode other than the predetermined mode is essentially prevented.

According to another aspect of the invention, a microwave oven is provided, which comprises a cavity that is fitted with at least two feeding ports, the feeding ports being arranged in different places, so that a predetermined mode in the cavity is feedable in at least two different points, while feeding of energy through said ports to another mode than the predetermined mode is essentially prevented. If a load is placed in the cavity and the mode pattern is thus distorted in such a manner that one of the feeding ports can no longer couple energy to the predetermined mode in an efficient way, the second feeding port will under some circumstances still work efficiently enough. Consequently, efficient feeding of microwaves to the cavity can be maintained also when the mode pattern is changed due to the presence of a load in the cavity by controlling the feeding of microwaves to a feeding port which gives a large coupling factor when feeding microwaves to the distorted mode.

According to another aspect of the invention, a microwave oven is provided, which comprises a cavity that is fitted with feeding ports at such locations that at least two modes are feedable while each feeding port only feeds a predetermined mode in the cavity. By controlling said feeding ports, the distribution of energy between said modes may thus be made to promote uniform heating of a load in the cavity. Preferably, said modes in the cavity have essentially non-overlapping heating patterns.

According to yet another aspect of the invention, a method is provided for heating, by means of energy in the form of microwaves, of a load in the cavity of a microwave oven, a first feeding port feeding energy to a first predetermined mode in the cavity, and feeding of energy from said first feeding port to another mode than the first predetermined mode is essentially prevented.

According to another aspect of the invention, a method is provided for heating, by means of energy in the form of microwaves, of a load in the cavity of a microwave oven, a first feeding port feeding energy to essentially only a first predetermined mode in the cavity, and a second feeding port feeds energy to essentially only a second predetermined mode in the cavity, the modes preferably having essentially non-overlapping heating patterns.

In an example of a microwave oven which has a design and a function in accordance with the present invention, the cavity is formed to support a predetermined set of modes. The cavity is furthermore fitted with a plurality of feeding ports, each feeding port essentially feeding energy to one associated mode in the cavity. When the microwave oven is in operation, said feeding ports are controlled so that uniform heating of a load placed in the cavity is promoted. The control may be performed on the basis of a plurality of various conditions, such as the temperature distribution in the load or the reflected power from the feeding ports. This control may, for instance, be performed by monitoring, by means of IR sensors, the actual temperature distribution across the load or by measuring the microwave power which is reflected from one or more of the feeding ports, the feeding being directed to such feeding ports as give an even temperature distribution and a low reflected power. The various modes in the cavity can also, owing to the fact that each feeding port feeds essentially one associated mode, be fed sequentially, whereby the possibility of controlling the energy distribution in the cavity is further increased.

A great advantage of the present invention is thus that a substantially more uniform heating of a load placed in the cavity of a microwave oven is provided. Unlike prior-art technique, it is possible by means of the present invention to eliminate the formation of hot and cold spots in the cavity to a very large extent. This uniform heating is allowed by the fact that the mode pattern in the cavity is controlled by means of microwave feeding via carefully positioned feeding ports. At least one feeding port then has the property that only one predetermined mode in the cavity can be fed from said feeding port. Consequently, an uncontrolled energy distribution in the cavity is efficiently avoided.

BRIEF DESCRIPTION OF THE DRAWINGS

In the following a number of preferred embodiments of the invention will be described in more detail. In the detailed description references are made to the accompanying drawings, in which.

DESCRIPTION OF PREFERRED EMBODIMENTS

Figure 1A:
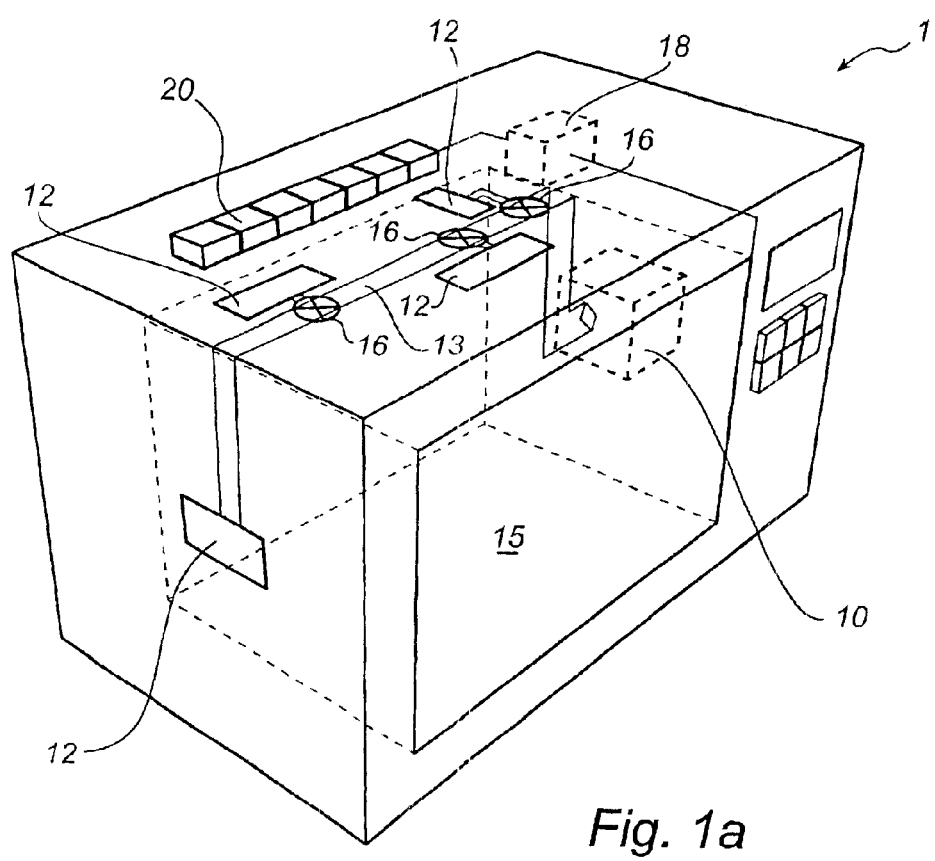
FIG. 1a is a general view of a microwave oven which has features and functions in accordance with the present invention.

FIG. 1a is a general view of a microwave oven 1 which has features and functions according to the present invention. The microwave oven comprises a microwave generator 10 which is operatively connected to a plurality of feeding ports 12 (in the shown example, four), through which microwaves are to be fed to the cavity 15 of the microwave oven. The generator 10 is connected to the feeding ports 12 by means of a transmission line 13 which connects to the feeding ports via a switch 16 associated with a respective feeding port. These switches can, while being controlled by a control unit 18, stop the feeding from a respective feeding port, whereby feeding from the intended feeding ports only is allowed. The switches 16 can also comprise means for measuring the microwave power that is reflected from each feeding port. The result of such a measurement is transmitted to the control unit 18 which uses the measurements to control the microwave feeding to suitable feeding ports. Moreover, a row of IR sensors 20 is preferably arranged in connection with the cavity, with the aim of measuring the temperature distribution in a load (not shown) that is placed in the cavity. Also the result of such a measurement is transmitted to the control unit 18 and is used for controlling the microwave feeding to suitable feeding ports. The four feeding ports shown in the figure are arranged to feed one predetermined mode each in the cavity 15. With the purpose of ensuring feeding of only one predetermined mode from each feeding port, the ports 12 are placed in such a manner that the coupling factor to the cavity is large only for the predetermined mode. This can be provided by placing the ports at locations where only one mode exhibits a large amplitude, by orientating the ports so that excitation of the correct polarisation is obtained, and by tuning the emission frequency of the microwave generator so as to fit the intended cavity mode.

Figure 1B:
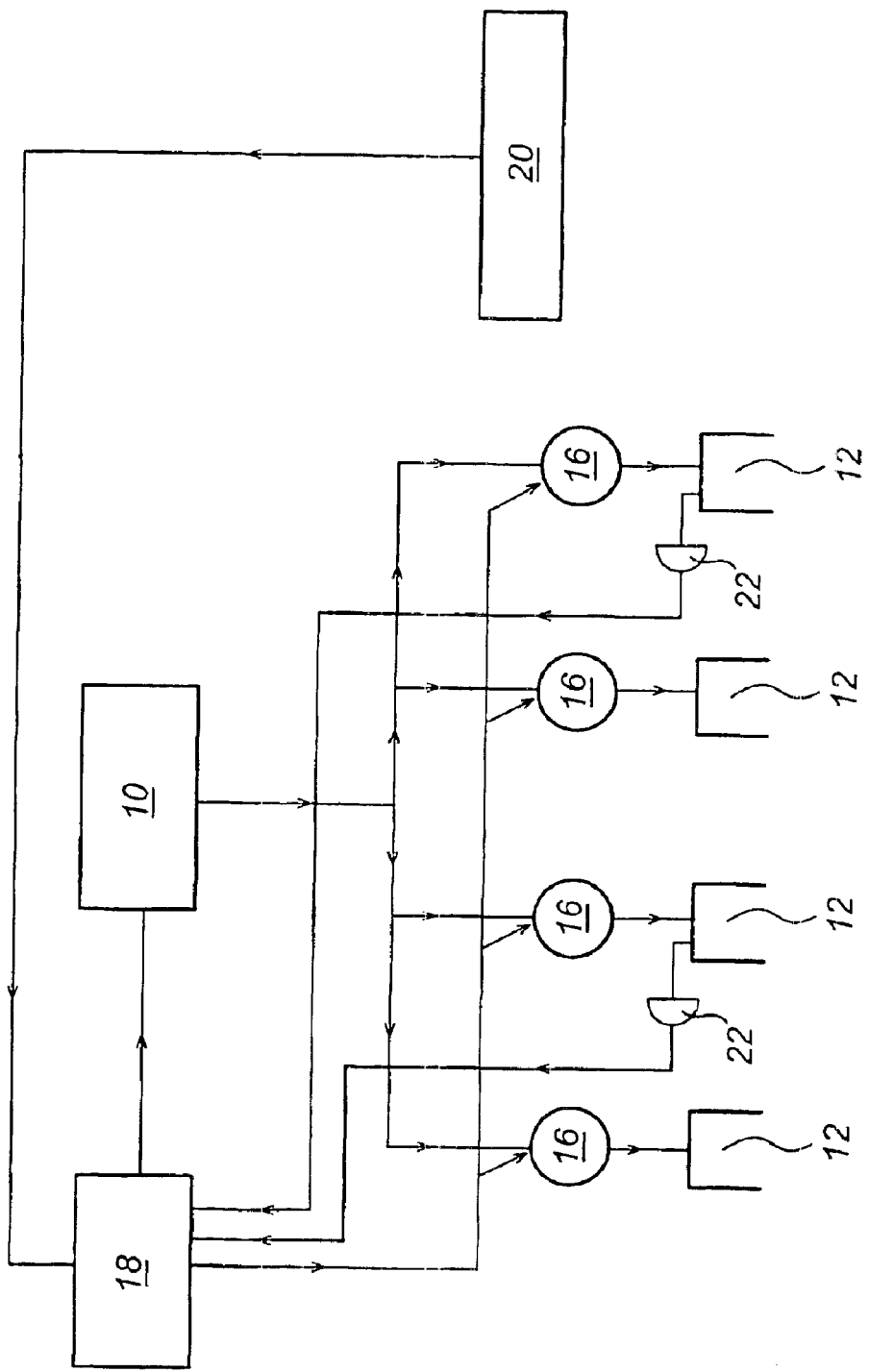
FIG. 1b shows a block diagram of the function of the microwave oven shown in FIG. 1a, FIG. 2 schematically shows a first cavity having a first feeding port, FIG. 3 schematically shows the mode pattern that is formed in connection with excitation from the feeding port shown in FIG. 2, FIG. 4 schematically shows a second cavity having a second feeding port, FIG. 5 schematically shows the mode pattern which is formed in connection with excitation from the feeding port shown in FIG. 4, FIG. 6 schematically shows a cavity which is provided with four feeding ports for excitation of four different modes in the cavity.

The general function of the microwave oven shown in FIG. 1a is illustrated in FIG. 1b in the form of a block diagram. The generator 10 feeds microwaves to the four feeding ports 12 via an associated switch 16. The switches are controlled by the control unit 18. In addition to parameters indicated by a user, the control may also take place on the basis of measured conditions in the microwave oven. In FIG. 1b two different examples of these are shown. Firstly, the controlling may take place on the basis of measured temperature distribution in the load placed in the cavity, the measurement being performed by means of a row of IR sensors 20. Secondly, the control may take place on the basis of a measurement, by means of detectors 22 of a type well known to those skilled in the art, of microwave power which is reflected from at least one feeding port. The results of the measurements are transmitted to the control unit 18 which interprets and uses these results for controlling the microwave generator 10 as well as the switches 16.

As pointed out above, the present invention is based on an understanding of how separate modes in the cavity of a microwave oven can be excited selectively by carefully arranging feeding ports. Preferably, but not necessarily, the feeding of microwaves from the microwave generator of the microwave oven to the cavity takes place by means of one or more transmission lines, for instance, striplines or microstrips, in which case the feeding ports comprise an H-loop or a slot in the ground plane of the transmission line. The preferred embodiment of the feeding ports will be described in more detail below. Feeding of the modes in the cavity thus takes place via the magnetic field of these modes, and, therefore, the feeding ports are preferably arranged at such locations where corresponding modes exhibit an amplitude maximum for the magnetic field (H-field).

Figure 2:
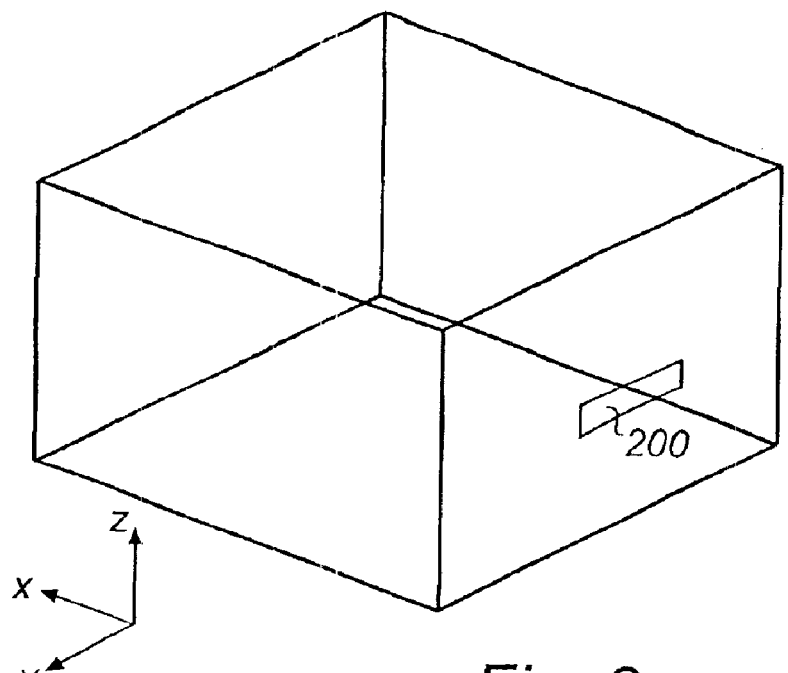
Figure 3:
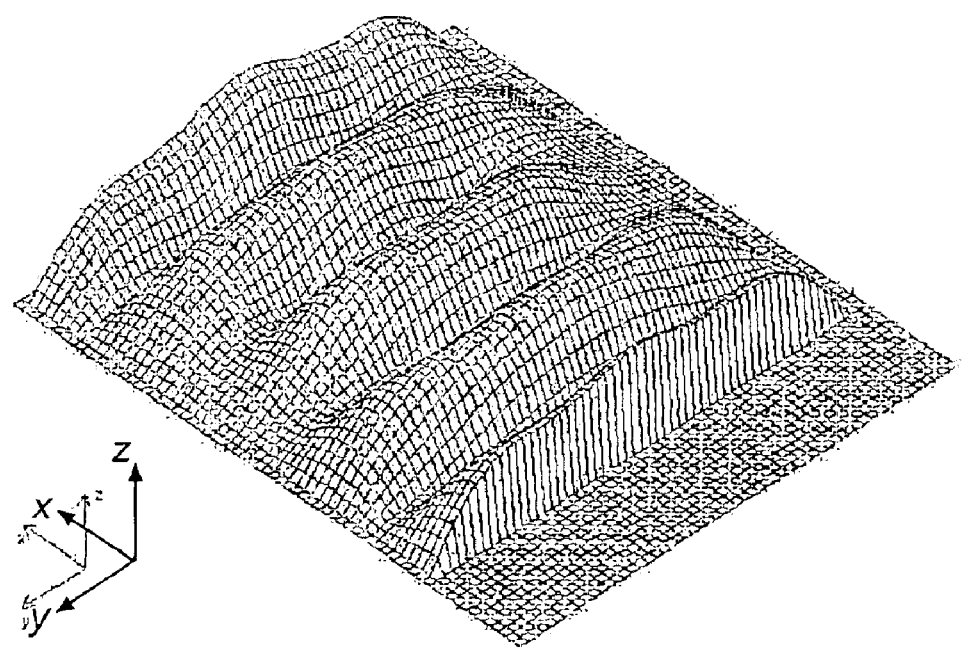
Figure 4:
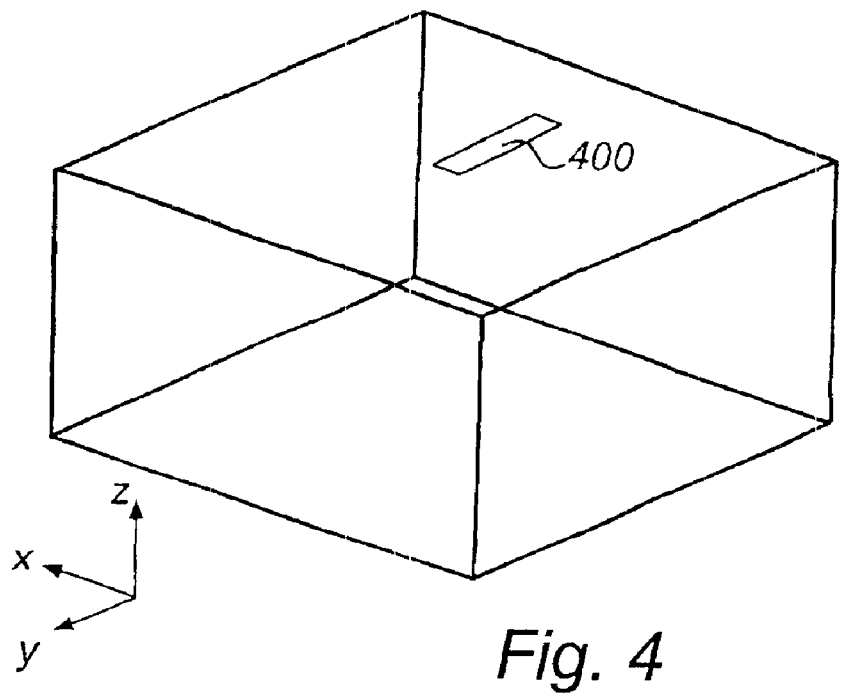
Figure 5:
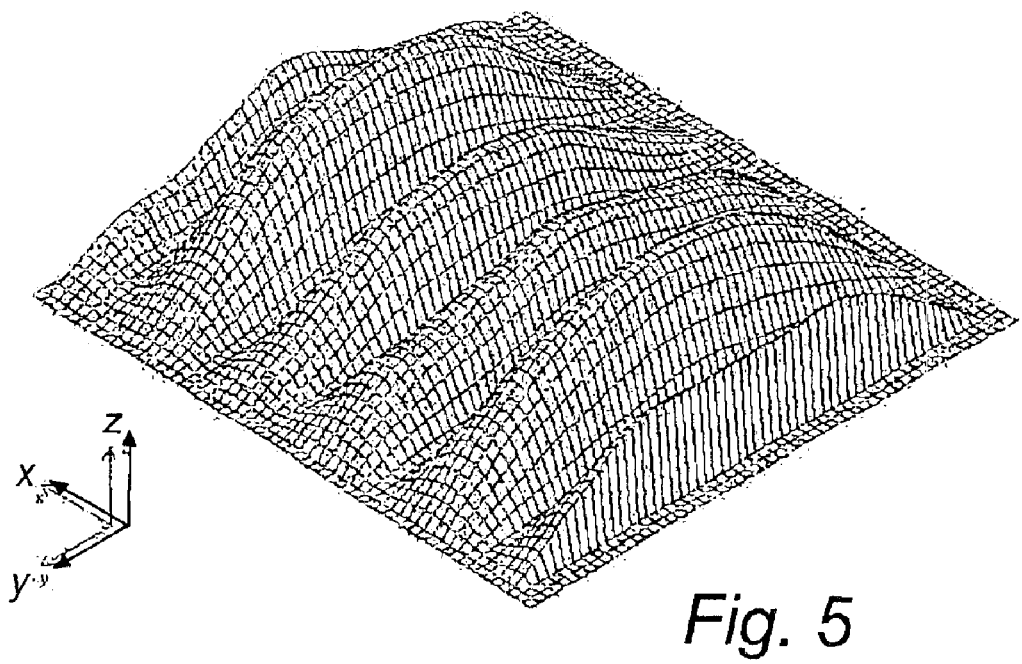

In FIGS. 2 and 4 two preferred arrangements of feeding ports are shown schematically in accordance with the present invention, and in FIGS. 3 and 5, the magnitude of the magnetic field is shown for corresponding cavity modes in the horizontal plane. The cavity in the example shown in FIGS. 2–5 has the dimensions b=327 mm, d=327 mm, h=189 mm and is resonant for, inter alia, the modes $TM_{511}$ and $TM_{412}$. The feeding port 200 shown in FIG. 2 is placed on the surface x=0, at y=d/2, z=h/2 and feeds microwaves essentially only to the cavity mode $TM_{412}$, while the feeding port 400 shown in FIG. 4 is placed on the surface z=h (the "top" of the cavity), at x=3*b/5, y=d/2 and feeds microwaves substantially only to the cavity mode $TM_{511}$. FIGS. 3 and 5 in reality show the result of actual simulations of the resulting energy distribution in the cavity when using the arrangements of the feeding ports shown in FIGS. 2 and 4. It is evident from the figures that excitation of other modes than the intended mode is negligible. In order to make this type of selective feeding of microwaves to selected modes in the cavity advantageous, it is thus necessary to carefully design the cavity with well chosen dimensions, so that the modes for which the cavity is resonant become unambiguous and well known.

Figure 6:
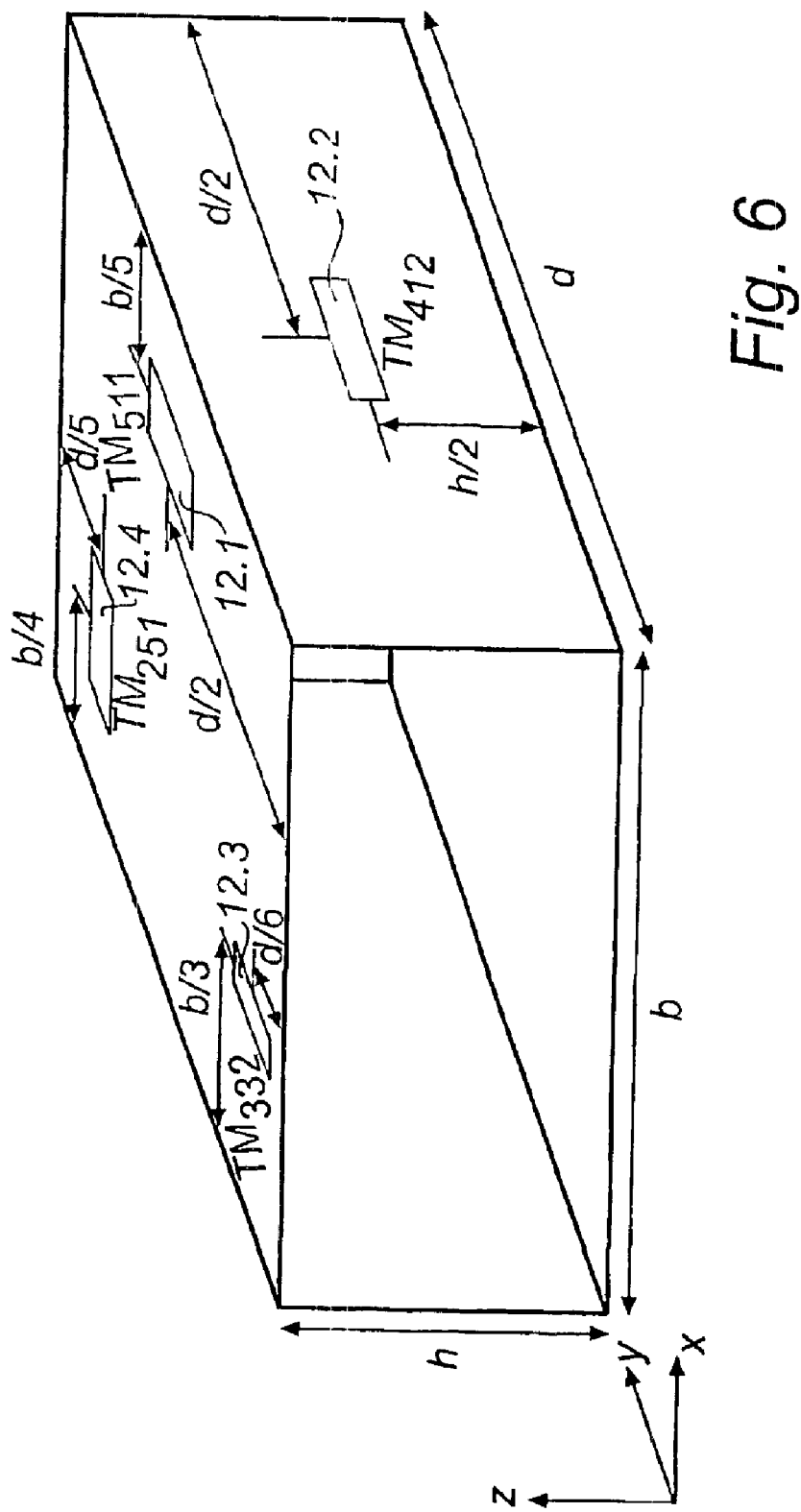

In line with the above reasoning, it is possible to go further and arrange feeding ports which correspond to various desired modes in the cavity. Examples of other arrangements of feeding ports are shown in FIG. 6. The dimensions of the cavity are in this example 327×350×189 $mm^3$ (i.e. b=327 mm, d=350 mm and h=189 mm), which gives resonance for the modes $TM_{511}$, $TM_{412}$, $TM_{332}$ and $TM_{251}$. Since each one of the feeding ports is arranged at a location where only one mode in the cavity exhibits a large, or substantially maximum amplitude of the magnetic field for the component which is excited, the intended situation is brought about, in which each feeding port feeds microwaves to essentially one predetermined mode only, while feeding of microwaves to a mode other than the predetermined mode is substantially prevented. Feeding ports are placed as follows by means of a system of co-ordinates as shown in the figure. The feeding port 12.1 of the mode $TM_{511}$ is placed on the enclosing surface at z=h (the "top" of the cavity) at x=4*b/5, y=d/2. The feeding port 12.2 of the mode $TM_{412}$ is placed on the enclosing surface at x=b and is centred on this surface at y=d/2, z=h/2. The feeding port 12.3 of the mode $TM_{332}$ is placed on the enclosing surface at z=h at x=b/3, y=d/6. The feeding port 12.4 of the mode $TM_{251}$ is placed on the enclosing surface at z=h at x=b/4, y=4*d/5. These arrangements of the feeding ports 12.1, 12.2, 12.3 and 12.4 are chosen in such a manner that mainly one predetermined mode in the cavity can be excited by means of a respective feeding port. Naturally, the above-mentioned modes can also be excited from other locations, but then there is also a risk of undesired modes in the cavity being excited.

Figure 7:
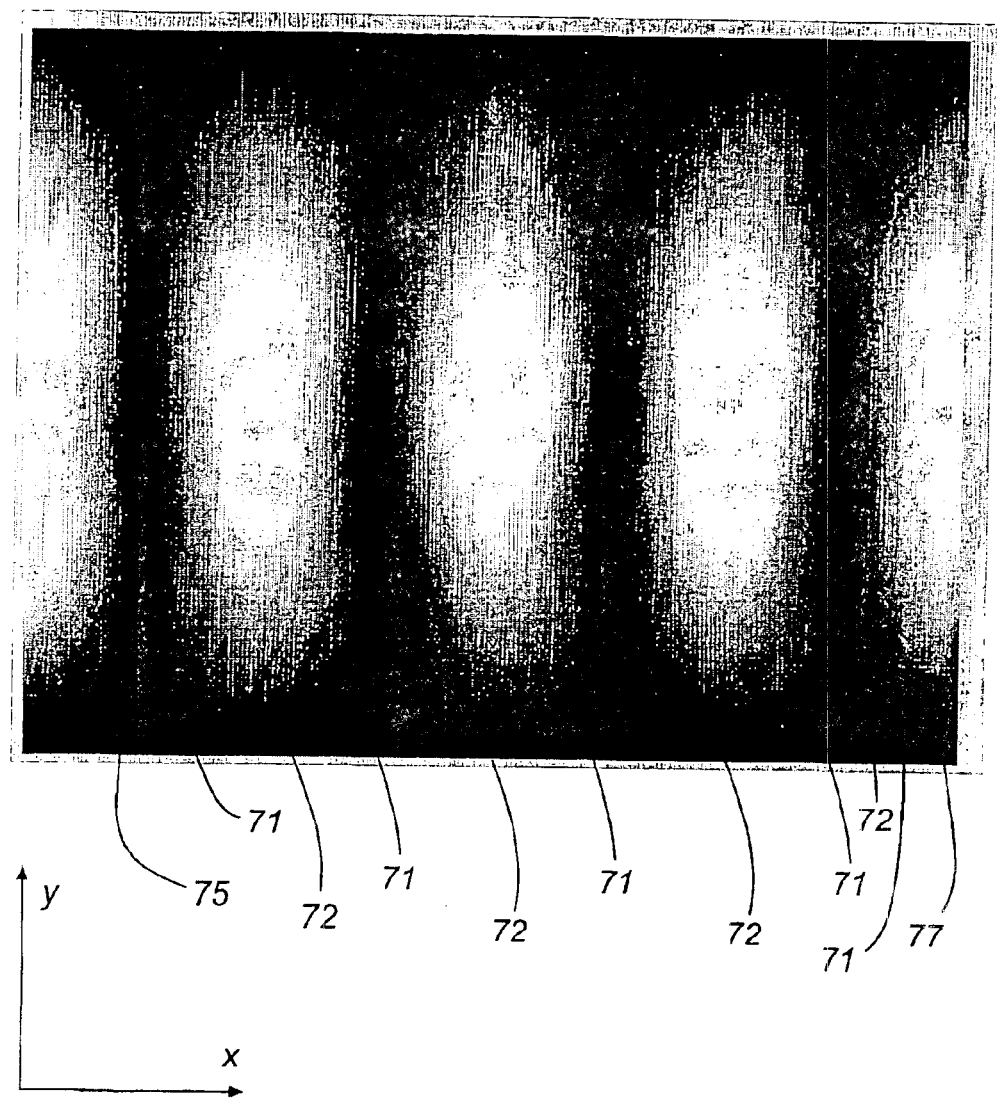
FIG. 7 is a schematic top plan view of the mode $TM_{412}$ in a cavity without a load.

FIG. 7 is a top plan view of the cavity of a microwave oven, the cavity having the dimensions 357×327×327×189 $mm^3$. In the figure the amplitude of the magnetic field is shown as regards a mode $TM_{412}$ (magnitude of $H_y$), which is generated in the cavity, in a plane 20 mm above the bottom of the cavity. Areas having a large amplitude 71 are substantially symmetrically distributed in the x-direction, separated by areas having a small amplitude 72. Between these areas 71, 72 the amplitude varies continuously. Efficient feeding of microwaves to the cavity may, as is evident from the figure, take place both from the left enclosing surface 75 in the figure and from the right enclosing surface 77 in the figure thanks to the fact that the amplitude of the magnetic field at these locations exhibits a maximum. Since the shown mode is $TM_{412}$, efficient feeding may also occur from locations close to the centre of the wall of the cavity and close to the top of the cavity. It will thus be appreciated that the mode $TM_{412}$ exhibits three maxima of the magnetic field in the z-direction. However, with a view to avoiding excitation of undesired modes in the cavity, feeding preferably takes place from a feeding port which is placed close to the centre of the wall of the cavity.

Figure 8:
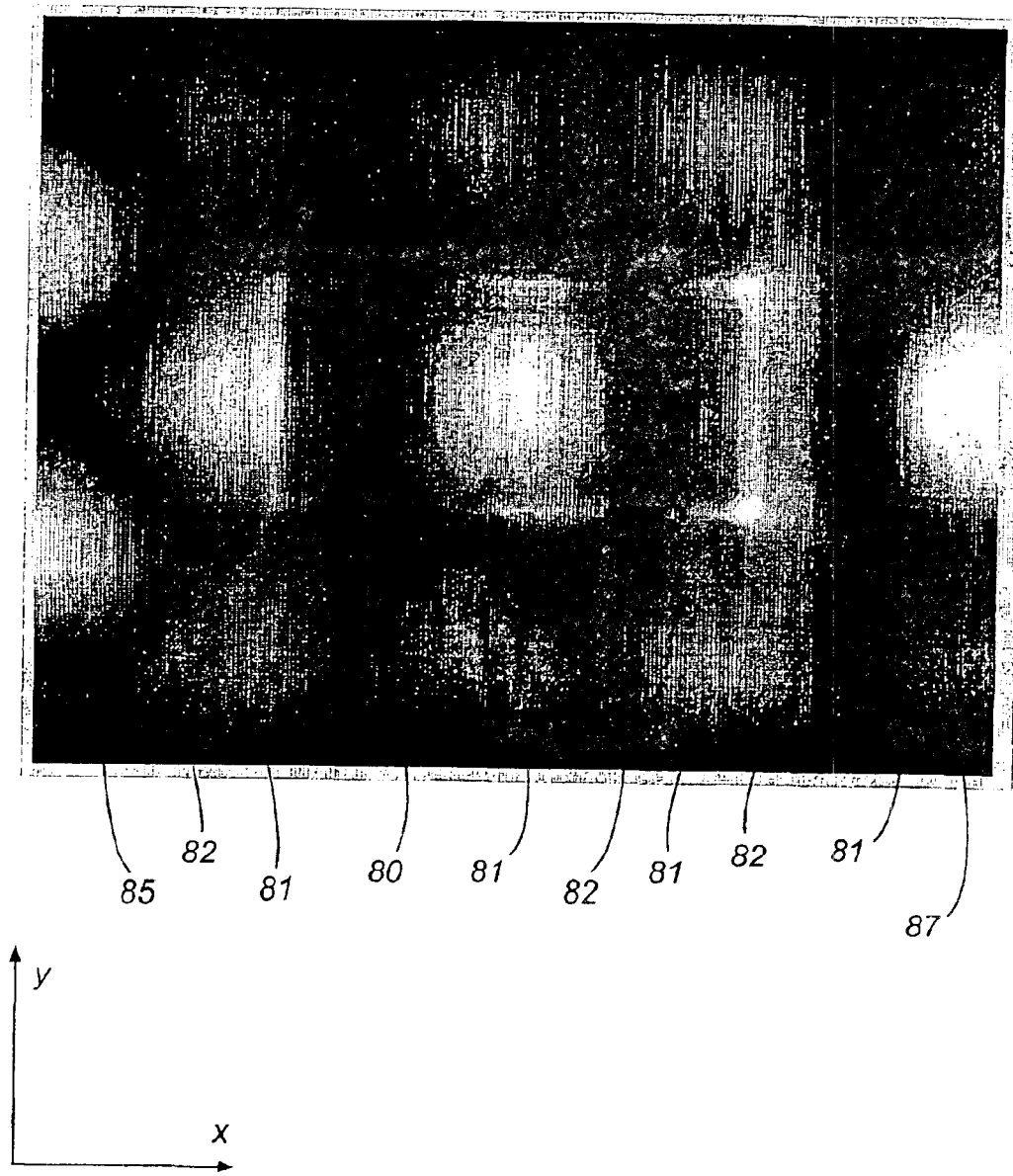
FIG. 8 is a schematic top plan view of the mode which is shown in FIG. 7 and which is now distorted due to the presence of a load in the cavity.

FIG. 8 once again shows the cavity shown in FIG. 7 but now with a load present. In the figure the load is illustrated in the form of a rectangle 80. The load causes a distortion of the mode pattern on a comparison with the appearance in connection with an empty cavity (cf. FIG. 7). The figure shows the amplitude (magnitude of $H_y$) of the magnetic field in a horizontal plane on a level with the upper side of the load, in this case 20 mm above the bottom plane of the cavity. The figure shows that the mode pattern is significantly distorted, and, therefore, areas having a large amplitude 81 and areas having a small amplitude 82 seem different from the case where the cavity is empty. If feeding of microwaves in this case would take place by means of, for example, an H-loop which is arranged to couple to the y-component ($H_y$) of the magnetic field, feeding to the distorted mode pattern still occurs efficiently enough from the right 87 or left 85 enclosing surface in the figure somewhat above the bottom of the cavity (along the y-axis close to the centre of the enclosing surface). Even if the figure shows a mode pattern in a plane 20 mm above the bottom of the cavity, it will be appreciated that the mode pattern also becomes distorted in a plane at half the cavity height. With the aim of avoiding excitation of undesired modes in the cavity, the feeding port of the mode $TM_{412}$ on the enclosing surface in question is, however, as pointed out earlier, preferably placed close to the centre of this surface. In other cases, the mode pattern will be distorted in another way. Various types of loads give, of course, different distortions of the mode pattern, of which the shown distortion is one example, but independent of how the mode pattern is changed when a load is placed in the cavity, the use of several feeding ports for one and the same predetermined mode will result in increased possibility of feeding microwaves to the mode. The advantageous function of a microwave oven with feeding according to the present invention is evident, so that an efficient enough feeding of microwaves to the cavity is allowed also in a distorted mode pattern due to the fact that one and the same predetermined mode in the cavity is fed from two or more feeding ports which are placed at different locations in the enclosing surface of the cavity. Preferably, the different feeding ports of one and the same mode are placed on sides of the cavity wall which are orthogonal in relation to one another.

With the purpose of avoiding that the microwave power is coupled from the cavity through a feeding port which at a certain point of time is not in operation, it is preferred that the feeding ports, when not in operation, are short-circuited by means of, for instance, a circulator and a switch, whereby coupling from the cavity through the short-circuited feeding port is prevented. If two or more feeding ports are used for feeding one and the same predetermined mode, it may, of course, happen that two or more of these feeding ports after all have a high coupling factor to the cavity mode, even though a load is placed in the cavity. If the feeding port then does not feed microwaves to the cavity, there is a risk of microwaves instead slipping out of the cavity through said feeding port, unless the feeding port is short-circuited in accordance with the above.

Figure 9:
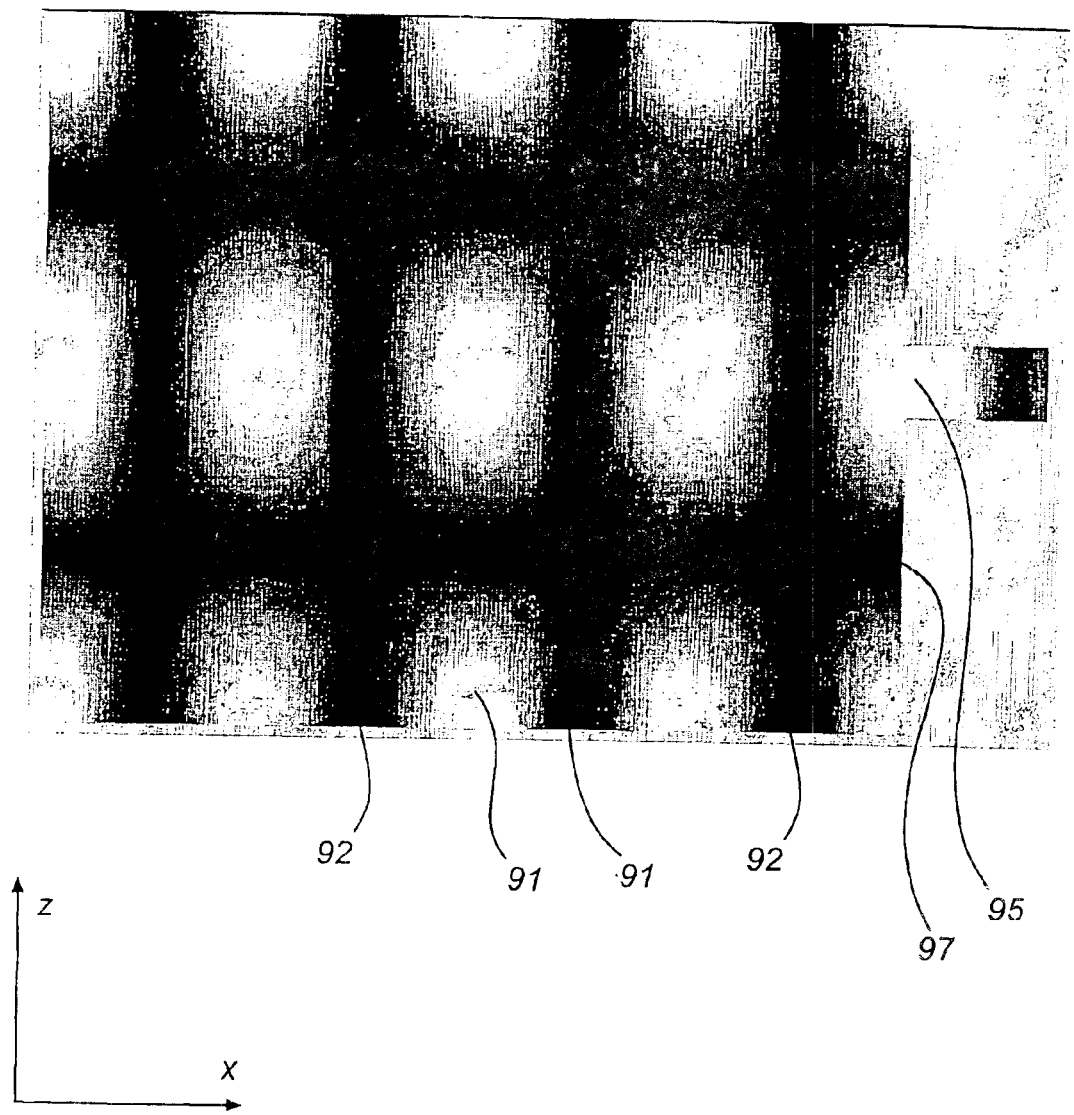
FIG. 9 is a schematic cross-sectional view of the mode shown in FIG. 7.
Figure 10:
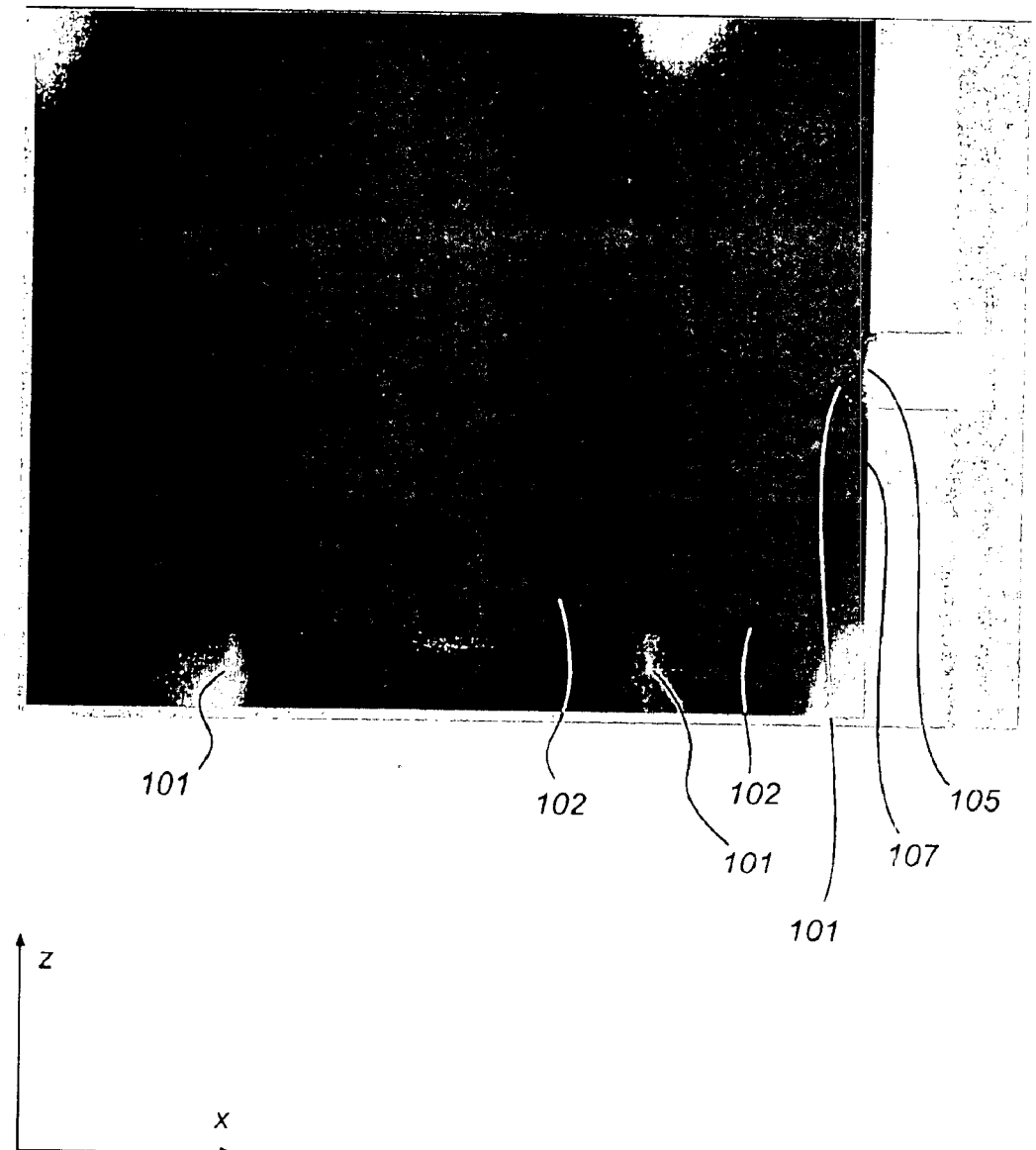
FIG. 10 is a schematic cross-sectional view of the distorted mode shown in FIG. 8, FIG. 11 schematically shows a second example of a cavity which is provided with four feeding ports for excitation of four different modes in the cavity, FIG. 12 schematically shows a row of IR sensors for detecting the temperature distribution in a load which is placed in the cavity of a microwave oven, FIG. 13 schematically shows a first heating pattern in the load, FIG. 14 schematically shows a second heating pattern in the load, FIG. 15 schematically shows how microwave feeding can be controlled between three different feeding ports, FIG. 16 schematically shows a first preferred example of a feeding port, FIG. 17 schematically shows a second preferred example of a feeding port, FIG. 18 schematically shows an arrangement for allowing measurement of the microwave power which is reflected from the feeding port, FIG. 19 schematically shows the power distribution (heating patterns) in a load as regards a first mode, and FIG. 20 schematically shows power distribution (heating patterns) in a load as regards a second mode.

FIG. 9 shows the same cavity as FIG. 7 but in the x-z-plane. The mode pattern is shown in one plane at half the cavity depth, that is in the plane where the feeding ports are to be placed according to the discussion in connection with FIGS. 7 and 8. FIG. 10 shows, in a corresponding way, the distorted mode pattern.

FIGS. 9 and 10 show that locations can be found, from which feeding takes place efficiently by the non-distorted mode as well as the distorted mode. Areas having a large amplitude 91, 101 are separated by areas having a small amplitude 92, 102 and it is evident from the figures how the mode pattern changes at the presence of a load in the cavity. FIGS. 9 and 10 show that an efficient feeding may occur from, for example, the right side 97, 107 of the figure, since the amplitude of the magnetic field is large there. The figures also show a feeding port 95, 105, which is placed on the enclosing surface 97, 107 to the right in the figure. In order to provide truly reliable feeding of a predetermined mode in the cavity both when the mode is distorted and when the mode is non-distorted, advantageously, it is possible to place feeding ports on all enclosing surfaces that are orthogonal in relation to one another and then control the feeding to such ports that have a high coupling factor to the cavity mode. Once again the inventive function is evident: at least one feeding port usually functions satisfactorily also when the mode pattern is distorted due to the presence of a load in the cavity.

Figure 11:
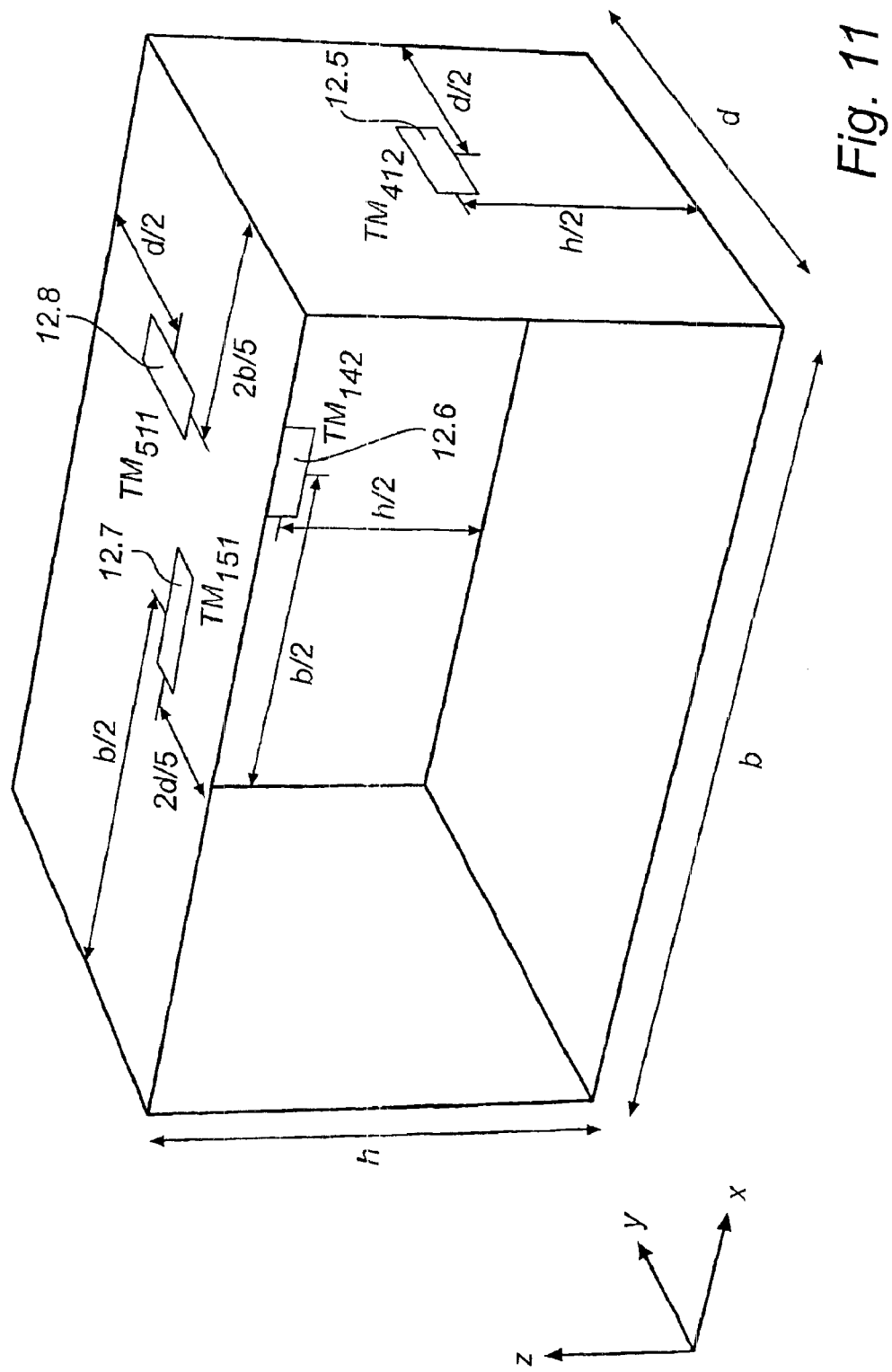

FIG. 11 shows yet another cavity of the microwave oven which is formed in accordance with the present invention. In this case, the cavity has a square cross-section in the horizontal plane. The dimensions of the cavity are b=327 mm, d=327 mm and h=189 mm, which make the cavity resonant to the modes $TM_{142}$, $TM_{412}$, $TM_{151}$ and $TM_{511}$. The feeding ports of the four modes mentioned above are placed as follows in a system of co-ordinates as that shown in the figure: the feeding port 12.5 of the mode $TM_{412}$ is placed on the enclosing surface x=b and is centred on this surface at y=d/2, z=h/2. The feeding port 12.6 of the mode $TM_{142}$ is placed on the enclosing surface y=d and is centred on this surface at x=b/2, z=h/2. The feeding port 12.7 of the mode $TM_{151}$ is placed on the enclosing surface z=h (the "top" of the cavity) at x=b/2, y=2*d/5. The feeding port 12.8 of the mode $TM_{511}$ is also placed on the enclosing surface z=h, but at x=3*b/5, y=d/2.

Both in FIGS. 6 and 11 the feeding ports are shown in the form of rectangles on the enclosing surface of the cavity. This indicates that there is yet another degree of freedom when placing the feeding ports, in addition to the locations at which the ports are placed, namely the orientation of the ports. The feeding ports couple microwaves to the modes of the cavity in a polarised manner, that is, either to the x-component of the magnetic field or to its y-component. It is easily appreciated by those skilled in the art that an H-loop or a slot in the ground plane of a transmission line connects to a predetermined component of the magnetic field. Thus, yet another possibility to prevent that a certain feeding port feeds microwaves to a mode in the cavity other than the intended mode.

Figure 12:
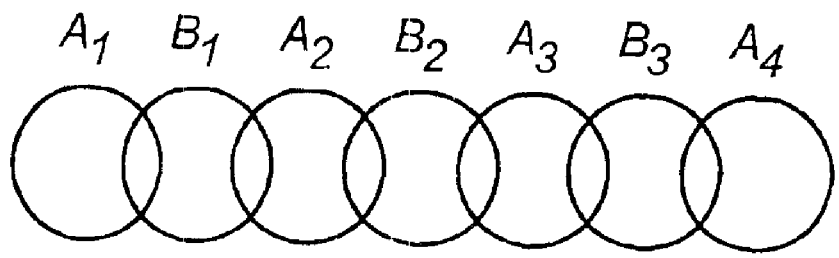
Figure 13:
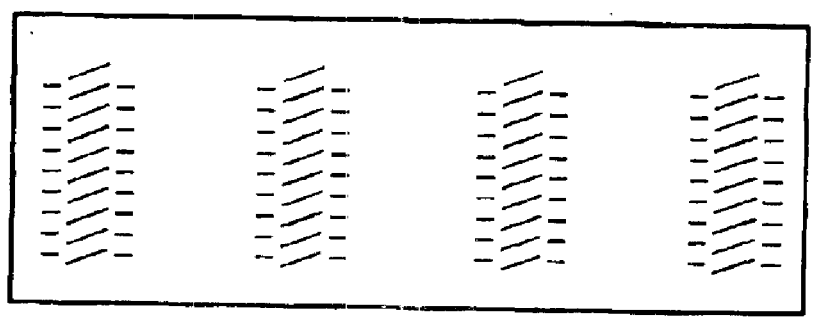
Figure 14:
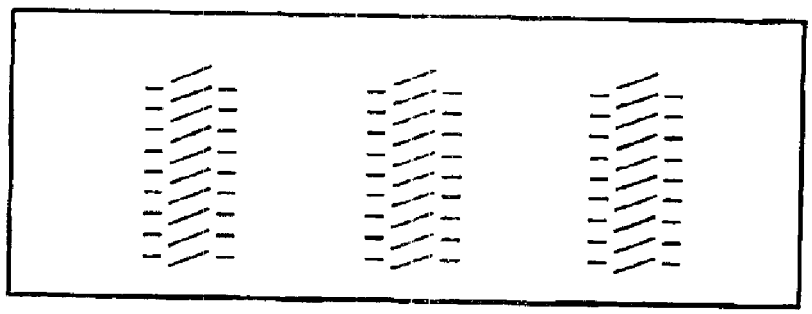

FIGS. 12–14 illustrate how sequential use of two cavity modes are used in order to obtain more uniform heating of a load placed in the cavity.

FIG. 12 schematically shows a row of IR sensors which may be used for measuring the temperature distribution in the load. A first group of sensors, $A_i$, measures the temperature in a first subset of the load and a second group of sensors, $B_i$, measures the temperature in a second subset of the load. Even if the measuring of the temperature distribution in this case only takes place in one dimension (along the x-axis), it is understood that a similar measuring just as well may take place in two dimensions (along the x-axis and y-axis).

The first subset of the load is mainly heated by means of a first cavity mode A, which is illustrated in FIG. 13. In a similar way FIG. 14 illustrates how a second subset of the load is heated mainly by a second cavity mode B. The parts of the load which are heated in the respective cases are shown in the form of dashed areas in the shown rectangular load.

Below, an itemised example is described of how the heating of the load can be controlled by means of the temperature distribution for the situation shown in FIGS. 12–14.

1. Start the heating by feeding the first mode A (i.e. heating the first subset of the load, the temperature of which is measured by the IR sensors $A_i$) during a time $Time_A = 10$ s.

2. Measure the temperature distribution by means of the row of IR sensors.

3. Calculate a first average temperature $t_A$ by averaging the measurement results from the sensors $A_i$.

4. Calculate a second average temperature $t_B$ by averaging the measurement results from the sensors $B_i$.

5. If current feeding takes place to the first mode A: if the cycle time of A has expired (current time>$Time_A$) or if $t_A > 1.5 * t_B$, change to feeding of the mode B during a time $Time_B = 10$ s.

6. If current feeding takes place to the second mode B: if the cycle time of B has expired (current time>$Time_B$) or if $t_B > 1.5 * t_A$, change to feeding of the mode A during a time $Time_A = 10$ s.

7. Repeat the steps 2–7 every second until the heating is ready.

The heating may, for example, be interrupted after a predetermined, set time or when one or both of the average temperatures $t_A$ and $t_B$ reach a predetermined value.

Note that in connection with heating according to the above schedule sequential feeding of the cavity modes is used. At an arbitrary point of time only one of the modes is thus energised, and, therefore, crosstalk between the modes are efficiently avoided. In the shown example a simple and non-distorted mode pattern is used by way of example, the mode pattern giving heating patterns which are easy to illustrate in the figures. In connection with the FIGS. 19–21 a similar situation will be described, but with a considerably distorted mode pattern.

Figure 15:
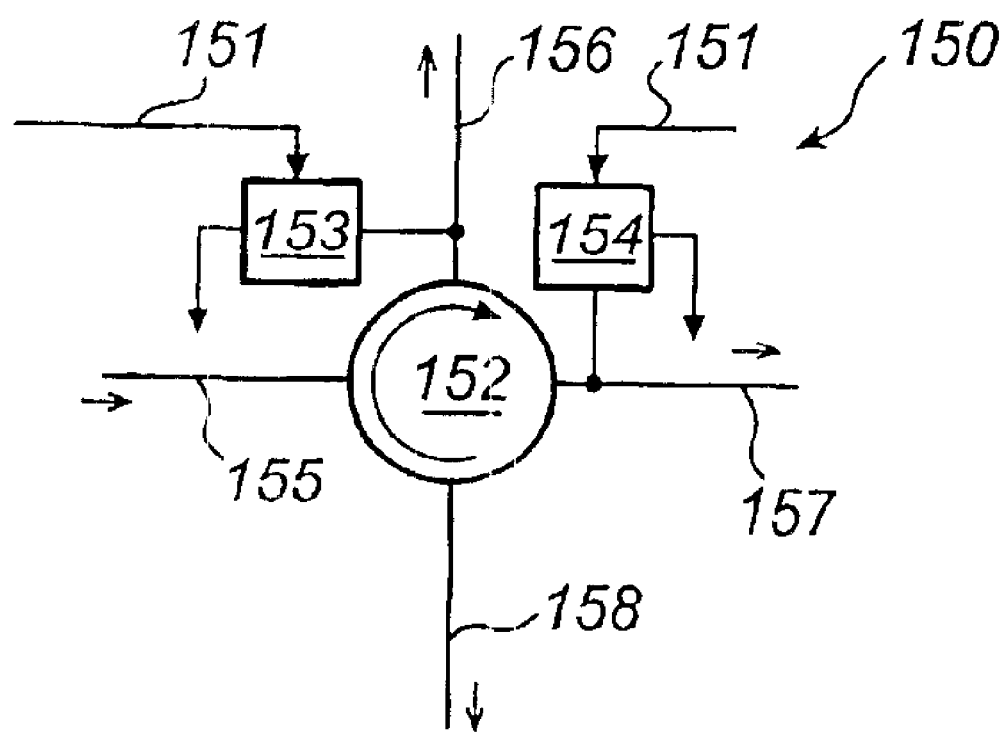

FIG. 15 schematically shows a type of switch 150 which advantageously is used in a microwave oven according to the present invention. The switch 150 comprises a circulator 152 with four terminals: an input 155 for feeding microwaves to the circulator 152 and three outputs 156, 157 and 158 for feeding microwaves to three different feeding ports (not shown). Moreover, the switch 150 comprises a feedback loop on one or more of the outputs 156, 157 and 158. When the feedback loop is closed, a reflection from the output arises which prevents microwaves from slipping out through the output. The feedback loop is closed, for instance, by means of solid-state switches 153, 154, the function of which is controlled by means of control signals which each are fed to an associated control input 151. By using a switch of the type shown in FIG. 15, it is possible to easily connect a microwave generator to at least three different feeding ports. In the cases of a microwave generator with variable frequency, it is also possible to tune the frequency as the switch changes to a new feeding port, so that an optimum feeding frequency is obtained for the respective feeding ports.

Figure 16:
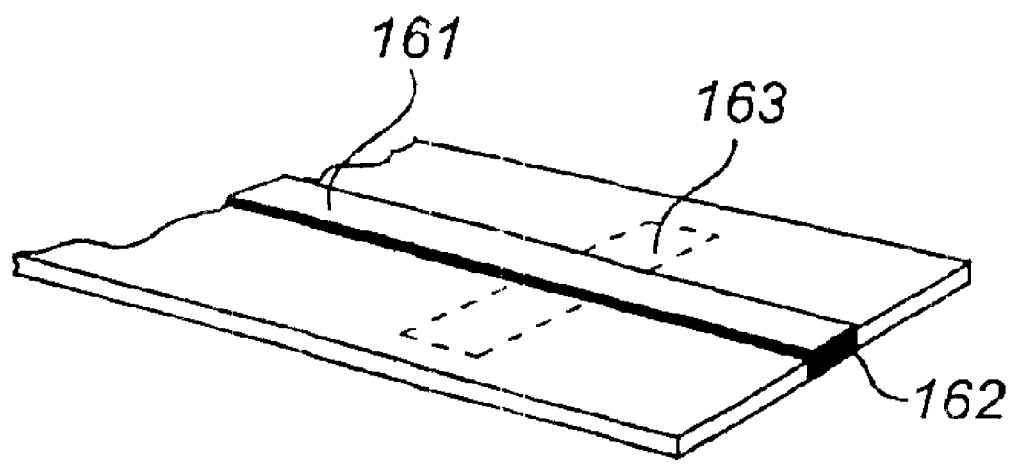

FIG. 16 shows a first embodiment of a feeding port according to the present invention. In the shown example microwaves are led to the feeding port by means of a transmission line 161 in the form of a microstrip, which is outside the enclosing surface of the cavity. The conducting plane of the microstrip is at one location 162 short-circuited with the ground plane, which results in the microwaves which propagate in the line 161 being reflected at said short circuit 162; a standing wave is formed in the transmission line 161. At a distance from said short circuit corresponding to half a wavelength in the microstrip, a slot 163 is formed in the ground plane and in the enclosing surface of the cavity. At said distance from the short circuit, the standing wave exhibits a maximum current in the transmission line 161 and, thus, the magnetic field also exhibits a maximum at this location. As usual the magnetic field extends, of course, circularly about the line and will thus be let into the cavity through said slot 163. In this case, excitation of one mode will take place, the mode having the magnetic field directed parallel to the extension of the slot 163.

Figure 17:
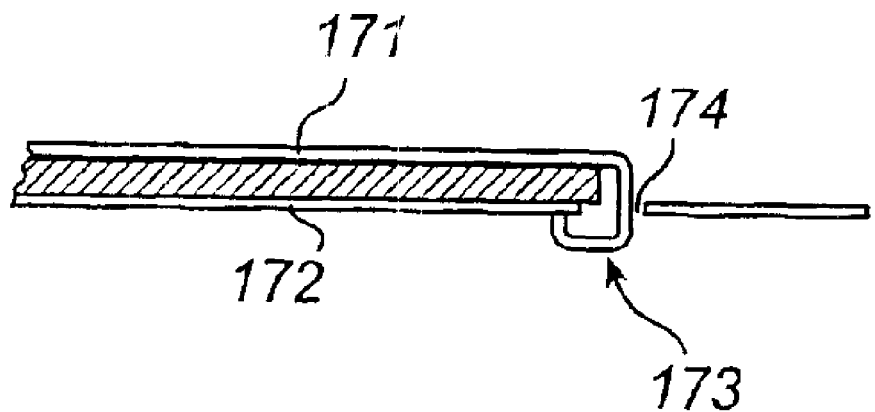

In FIG. 17 a second embodiment is shown of a feeding port according to the present invention. Unlike the preceding case with a slot in the ground plane/the cavity wall, the conducting plane 171 is now short-circuited with the ground plane 172 in the form of a loop 173 which reaches through an opening 174 in the cavity wall. Current will thus bypass the loop 173 and, consequently, induce a magnetic field transversely to the plane of the loop. Said loop is therefore named H-loop since coupling occurs to the H-field in the cavity. In this case, excitation of a mode will occur, having the magnetic field directed perpendicular to the plane of the H-loop 173.

Microwave feeding by means of one of the described feeding ports thus gives coupling to only one of the components of the magnetic field and, in accordance with that discussed earlier, consequently yet another possibility of exciting primarily one single predetermined mode in the cavity.

Figure 18:
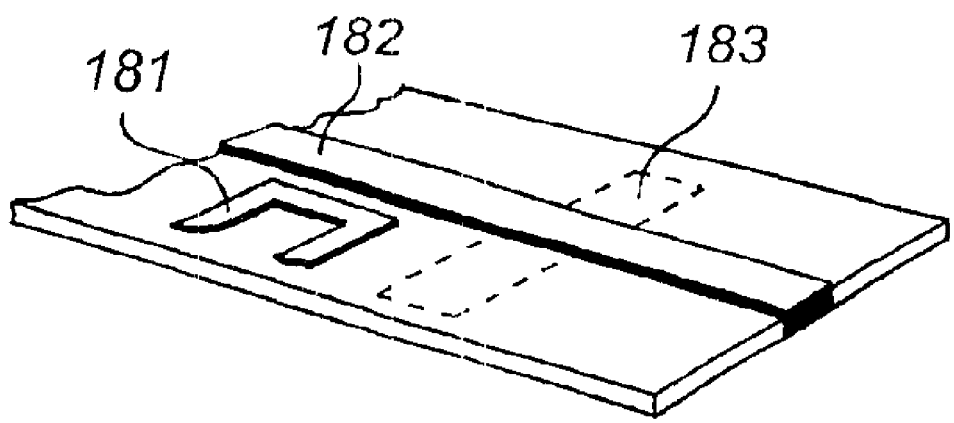

If the coupling to the cavity is not perfect, some microwave power will be reflected back through the feeding port, back into the transmission line. An advantageous, and thus preferred, way to control whether there is a satisfactory coupling to the cavity, is by measuring the power that is reflected from the feeding port. FIG. 18 shows a preferred example of how such measuring may be provided in the case with one feeding port which comprises a slot 183 in the ground plane. A directional coupler 181 is arranged adjacent to the transmission line 182 above, that is up-stream of, the slot 183. The directional coupler 181 is in the form of a line that runs parallel to the transmission line 182 across a distance which corresponds to a quarter of the wavelength of the microwaves in the line 182. A potential microwave power that propagates up-stream of the slot 183 will thus be disconnected via the directional coupler 182 and may subsequently be measured in an already known manner. The result of such a measurement may be used to control the feeding to the cavity. When the reflected power, for instance, exceeds a limiting value, the feeding of microwaves can be directed to an alternative feeding port, where the reflection is lower. By such control, it is possible to avoid that too much power is wasted, and, thus, also improve the efficiency of the entire microwave oven.

If microwave feeding is allowed to continue to a feeding port, from which a large amount of reflection takes place, the reflected power has to be taken care of in one way or another. Either the microwaves are allowed to propagate back to the microwave generator, or the microwaves are allowed to be transformed to waste heat in some type of microwave sink. It is obvious that both these alternatives are undesirable. Great advantages are thus obtained by being able to control the feeding to ports having a low reflection.

Preferably, the feeding of microwaves is controlled in such a manner that the total reflected power from the cavity is reduced to a minimum, the largest possible ratio of available microwave power thus being used for heating of the load placed in the cavity.

Preferably, one or more microwave generators (microwave sources) having a variable emission frequency is used in embodiments of the present invention.

In the cases when only one microwave source is used, the microwave source may drive, at one and the same point of time, a plurality of feeding ports or one feeding port only. One advantage which is allowed with a variable emission frequency is that the coupling to a predetermined mode in the cavity can be exactly adjusted by tuning the emission frequency of the microwave source. For instance, in the case with a distorted mode caused by the presence of a load in the cavity, it is possible to achieve an essentially perfect connection to the cavity by tuning the frequency to the distorted mode.

In other cases a plurality of feeding ports are driven sequentially by one and the same microwave source. It is then possible to adapt the emission frequency to the feeding port (i.e. the cavity mode) which, at one moment, is fed with microwaves and, thus, for each feeding port provides the highest possible coupling to the intended cavity mode. When the feeding is switched to a new feeding port, also a potential tuning of the emission frequency is performed.

In a microwave oven with a plurality of microwave sources having a variable emission frequency, naturally, even greater possibility of controlling the mode pattern in the cavity is obtained. For instance, simultaneous feeding is allowed of the cavity with two different frequencies.

Yet another preferred embodiment is characterised in that a predetermined microwave source is adapted to feed a predetermined mode in the cavity by means of at least two feeding ports which are placed at different locations, so that said predetermined mode in the cavity is feedable in at least two separate points. The possibility of efficient feeding of the cavity in a considerably distorted mode (caused by the presence of a load in the cavity) is thus further increased due to the fact that it is also possible to choose, in addition to being able to choose a suitable feeding port, an emission frequency that is convenient for the distorted mode.

Figure 19:
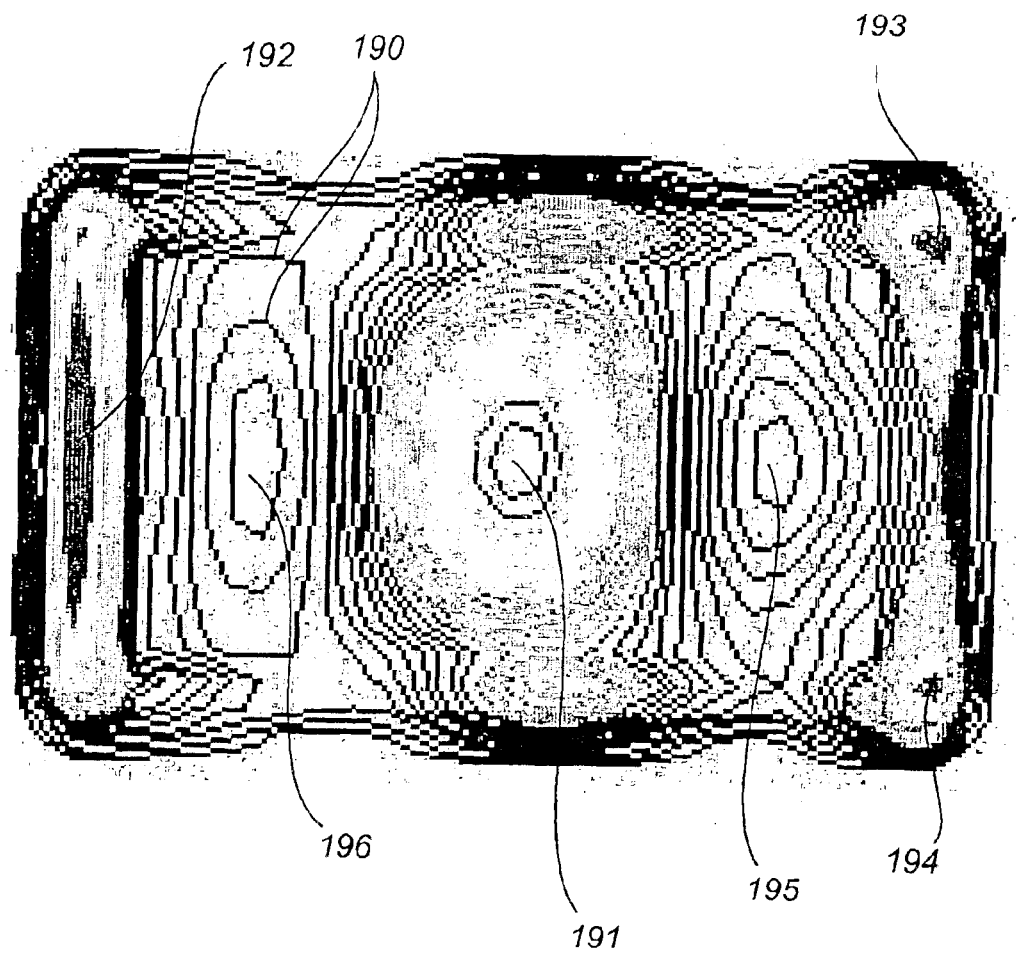
Figure 20:
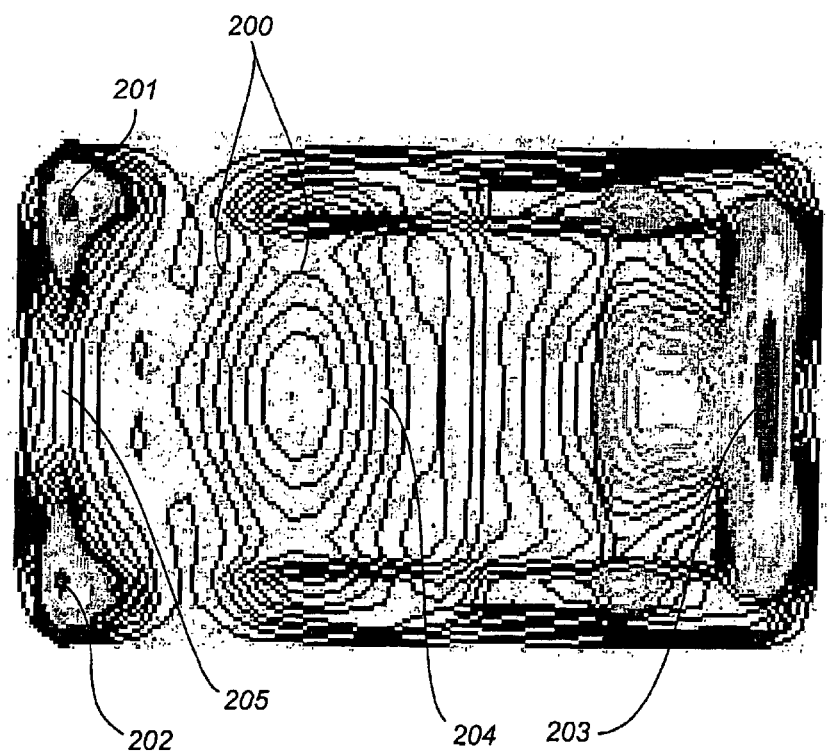

FIGS. 19 and 20 show the temperature distribution in a rectangular load seen from above when heating by means of a first and a second cavity mode, respectively. The temperature is shown by contour plots 190, 200 (isotherms).

FIG. 19 shows the temperature distribution in the load when only the first mode is used for the heating. The mode in the shown example is $TM_{412}$ and it is clear that hot spots appear in the centre 191 of the load in the middle of the edge 192 to the left in the figure and adjacent to the upper 193 and lower 194 corner of the edge to the right in the figure. At the same time cold spots appear to the right 195 and to the left 196 of the centre 191 of the load.

FIG. 20 shows the temperature distribution in the load when only the second mode is used for the heating.

The mode in the shown example is $TM_{511}$, and it is evident that hot spots appear adjacent to the upper 201 and the lower 202 corner of the edge to the left in the figure and in the centre of the edge 203 to the right in the figure. Clear cold spots appear close to the centre 204 of the load and adjacent to the middle of the edge 205 to the left in the figure.

Since the cavity of the microwave oven is fed sequentially in the two modes which correspond to the heating patterns which are shown in FIGS. 19 and 20, substantially more uniform heating of the load is thus obtained. Such sequential feeding may, for instance, take place on the analogy of the method that has been described in connection with FIGS. 12–14.

After having read and understood the description of the present invention, those skilled in the art will, by means of calculations and experiments, find a wide range of possibilities of combining the location of the feeding ports and different heating patterns of the cavity modes, the combinations resulting in a microwave oven according to the present invention having superior performance and functions on a comparison with microwave ovens according to prior-art technique.

Although the invention has been described with reference to specific embodiments, it is understood that various modifications and additions may be made within its scope. The scope of the invention is defined in, and should be limited only by, the appended claims.

What is claimed is:

1. A microwave oven comprising a cavity that is defined by an enclosing surface and adapted to receive a load to be heated, and a microwave source which is connected to the cavity for feeding microwaves to the cavity, which cavity is provided with at least two feeding ports wherein the cavity is designed to support at least two modes which are separately feedable through at least a respective feeding port and the separately feedable modes exhibits essentially non-overlapping heating patterns, and each one of the feeding ports is arranged to feed energy to a respective predetermined mode in the cavity, while feeding of energy to a mode other than the predetermined associated mode is essentially prevented, the feeding ports being placed at such a location that mainly one single mode is feedable by means of each feeding port and a transmission line in the form of a stripline or a microstrip, wherein the transmission line has a slot in its ground plane at a location that at least partly overlaps the feeding port at the same time as the transmission line exhibits a maximum current at the slot, whereby the magnetic field in the transmission line is let into the cavity and, thus, feeds energy to it.

2. A microwave oven as claimed in claim 1, wherein each feeding port is provided at a location where a predetermined mode in the cavity exhibits an essentially maximum amplitude of the magnetic field.

3. A microwave oven as claimed in claim 1, wherein the ground plane of the transmission line is short-circuited with its conducting plane by means of a loop which protrudes into the cavity through the feeding port, whereby an H-loop is formed which feeds energy into the cavity.

4. A microwave oven as claimed in claim 3, wherein each feeding port is placed at a location where a predetermined mode in the cavity exhibits an essentially maximum amplitude of the magnetic field.

5. A method for heating by means of energy in the form of microwaves, a load in the cavity of a microwave oven, wherein a first feeding port feeds energy to a first predetermined mode in the cavity, and a second feeding port feeds energy to a second predetermined mode in the cavity in such a manner that the first mode is essentially unaffected by the energy which is fed from the second feeding port, and the second mode is essentially unaffected by the energy which is fed from the first feeding port, wherein the first and the second feeding port sequentially feeds microwaves to the cavity in such a manner that only one of the first and second feeding port feeds energy into the cavity at any one instant, wherein the modes have essentially non-overlapping heating patterns, whereby a first mode provides heating of mainly a first subset of the load and a second mode provides heating of mainly a second subset of the load, the subsets being essentially non-overlapping, wherein reflected microwave power from at least one of the feeding ports is measured, and wherein the result of the measurement is used for controlling the feeding of microwaves to the cavity.

6. A method as claimed in claim 5, wherein the feeding to the cavity is controlled in such a manner that the reflected power from the cavity is minimised.

7. A method as claimed in claim 5, wherein a temperature profile of the load is measured, and wherein the result of the measurement is used for controlling the microwave feeding to the cavity.

8. A method as claimed in claim 7, wherein the feeding to the cavity is controlled in such a manner that an even temperature profile of the load is promoted.

9. A method as claimed in claim 5, wherein feeding of energy to the cavity is provided by means of a single microwave source having an essentially fixed emission frequency, the microwave source being connected to all the feeding ports.

10. A method as claimed in claim 9, wherein the microwave source is connected to the feeding ports by means of a network of transmission lines, preferably stripline or microstrip, the microwave power that is emitted by the microwave source being directed to the intended feeding ports by means of passive components, such as directional couplers and/or circulators which are arranged in the network.

11. A method as claimed in claim 9, wherein the microwave source is connected to the feeding port by means of a network of transmission lines, preferably stripline or microstrip, the microwave power that is emitted by the microwave source being directed to the intended feeding ports by means of passive components, such as directional couplers and/or circulators which are provided in the network.

12. A method as claimed in claim 5, wherein feeding of energy to the cavity is provided by means of one single microwave source having a variable emission frequency, the microwave source being connected to all the feeding pots.

13. A method as claimed in claim 12, wherein the reflected power from the cavity is reduced to a minimum by the emission frequency of the microwave source being tuned to a frequency which gives a high coupling factor to the cavity.

14. A method as claimed in claim 12, wherein at least a first and a second feeding port are driven sequentially by the microwave source, and the microwave source, when driving the first feeding port, is tuned to a first emission frequency and, when driving the second feeding port, is tuned to a second emission frequency.

15. A method as claimed in claim 5, wherein the feeding of energy to the cavity is provided by means of a plurality of microwave sources, each one having an essentially fixed emission frequency, and wherein each microwave source is connected to one or more feeding ports corresponding to a predetermined mode and frequency in the cavity as regards a respective source.

16. A method as claimed in claim 5, wherein feeding of energy to the cavity is provided by means of a plurality of microwave sources having a variable emission frequency, and wherein each microwave source is connected to one or more feeding ports corresponding to a predetermined mode and frequency in the cavity as regards a respective source.

17. A method as claimed in claim 16, wherein the emission frequency of the respective microwave sources is controlled in such a manner that the reflected power from the cavity of the microwave oven is reduced to a minimum.

18. A method as claimed in claim 16, wherein the power which is emitted from a respective microwave source is controlled in such a manner that uniform heating of a load placed in the cavity of the microwave is promoted.

19. A method as claimed in claim 18, wherein the control takes place on the basis of the result of a measurement of the temperature distribution in the load.

20. A method as claimed in claim 19, wherein the measurement is carried out by means if IR sensors.

* * * * *